United States Patent
Joshi et al.

(10) Patent No.: US 11,458,935 B1
(45) Date of Patent: Oct. 4, 2022

(54) AXLE-INTEGRATED PARK BRAKE FOR WORK VEHICLE

(71) Applicant: Deere & Company, Moline, IL (US)

(72) Inventors: Shantanu S. Joshi, Pune (IN); Galen R. Love, Independence, KS (US); Kevin M. Allen, Bartlesville, OK (US); Ravindra Khot, Pune (IN); Garrett F. Dollins, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/471,560

(22) Filed: Sep. 10, 2021

(51) Int. Cl.
*B60T 1/06* (2006.01)
*B60T 13/22* (2006.01)
*F16H 57/04* (2010.01)
*B60K 17/16* (2006.01)

(52) U.S. Cl.
CPC .............. *B60T 1/062* (2013.01); *B60T 13/22* (2013.01); *B60K 17/165* (2013.01); *F16H 57/0473* (2013.01); *F16H 57/0483* (2013.01)

(58) Field of Classification Search
CPC ....... B60T 1/062; B60T 13/22; B60K 17/165; F16H 57/0473; F16H 57/0483
See application file for complete search history.

(56) References Cited

U.S. PATENT DOCUMENTS

| | | | |
|---|---|---|---|
| 7,192,376 B2 * | 3/2007 | Ishii | F16D 39/00 475/237 |
| 8,028,788 B2 | 10/2011 | Stilwell et al. | |
| 9,611,930 B2 | 4/2017 | Marathe et al. | |
| 2005/0266951 A1 * | 12/2005 | Han | B60K 17/02 475/198 |
| 2018/0363755 A1 * | 12/2018 | Wakui | B60T 1/062 |

FOREIGN PATENT DOCUMENTS

| | | |
|---|---|---|
| CN | 208714845 U | 4/2019 |
| CN | 112297711 A | 2/2021 |
| KR | 101524734 B1 | 6/2015 |

\* cited by examiner

*Primary Examiner* — Colby M Hansen
(74) *Attorney, Agent, or Firm* — Klintworth & Rozenblat IP LLP

(57) ABSTRACT

A work vehicle includes a drive axle assembly having an axle housing with an input opening and output openings in communication with an interior cavity. A gear assembly is disposed in the interior cavity of the axle housing, with the gear assembly having an input shaft extending through the input opening and coupled for co-rotation with a drive shaft. A park brake assembly is integrated with the drive axle assembly and is disposed within the axle housing. The park brake assembly imparts a brake force to arrest rotation of the input shaft, with the park brake assembly including a brake pack and a piston disposed about the input opening of the axle housing and with the piston configured to move relative to and act on the brake pack. A Belleville spring arrangement is also disposed about the input opening of the axle housing and acts on the piston to engage or release the park brake.

20 Claims, 4 Drawing Sheets

AXLE-INTEGRATED PARK BRAKE FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to a park brake assembly in a work vehicle.

BACKGROUND OF THE DISCLOSURE

Off-road and other work vehicles typically utilize a park brake that is separate from the service brakes. The park brake can be engaged with a drivetrain component of the work vehicle to substantially prevent or inhibit movement of the vehicle. The park brake may include a piston whose movement is controlled by a spring arrangement and hydraulic mechanism to selectively apply pressure to an assembly of alternating friction discs and separator plates. The friction discs may be caused to selectively contact and engage the drivetrain component to apply a braking force thereto.

SUMMARY OF THE DISCLOSURE

A work vehicle includes an engine, a drive shaft configured to be rotated by the engine, and a drive axle assembly. The drive axle assembly further includes an axle housing having an input opening and output openings in communication with an interior cavity, axle shafts coupled to ground-engaging wheels or tracks of the work vehicle, and a gear assembly disposed in the interior cavity of the axle housing, the gear assembly having an input shaft extending through the input opening and coupled for co-rotation with the drive shaft, the gear assembly coupled to the axle shafts at the output openings and configured to transfer rotational power from the drive shaft to one or more of the axle shafts to cause rotation of one or more of the axle shafts. The work vehicle also includes a park brake assembly disposed within the axle housing and configured to impart a brake force to arrest rotation of the input shaft of the gear assembly, with the park brake assembly comprising an annular brake pack disposed about the input opening of the axle housing, an annular piston disposed about the input opening of the axle housing and configured to move relative to and act on the brake pack, and a spring arrangement disposed about the input opening of the axle housing and comprising a Belleville spring acting on the piston.

In another implementation, a drive axle assembly with integrated park brake is provided for a work vehicle. The assembly includes axle shafts coupled to ground-engaging wheels or tracks of the work vehicle and a gear assembly having an input shaft coupled for co-rotation with a drive shaft of the work vehicle and coupled to the axle shafts to selectively transfer rotational power from the drive shaft to the axle shafts to cause rotation of one or more of the axle shafts. The assembly also includes an axle housing enclosing the gear assembly and a park brake assembly disposed within the axle housing that is configured to impart a brake force to arrest rotation of the input shaft of the gear assembly. The park brake assembly further includes an annular brake pack disposed about the input shaft, an annular piston disposed about the input shaft and configured to move relative to and act on the brake pack, and a Belleville spring unit disposed adjacent the piston and that acts on the piston.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
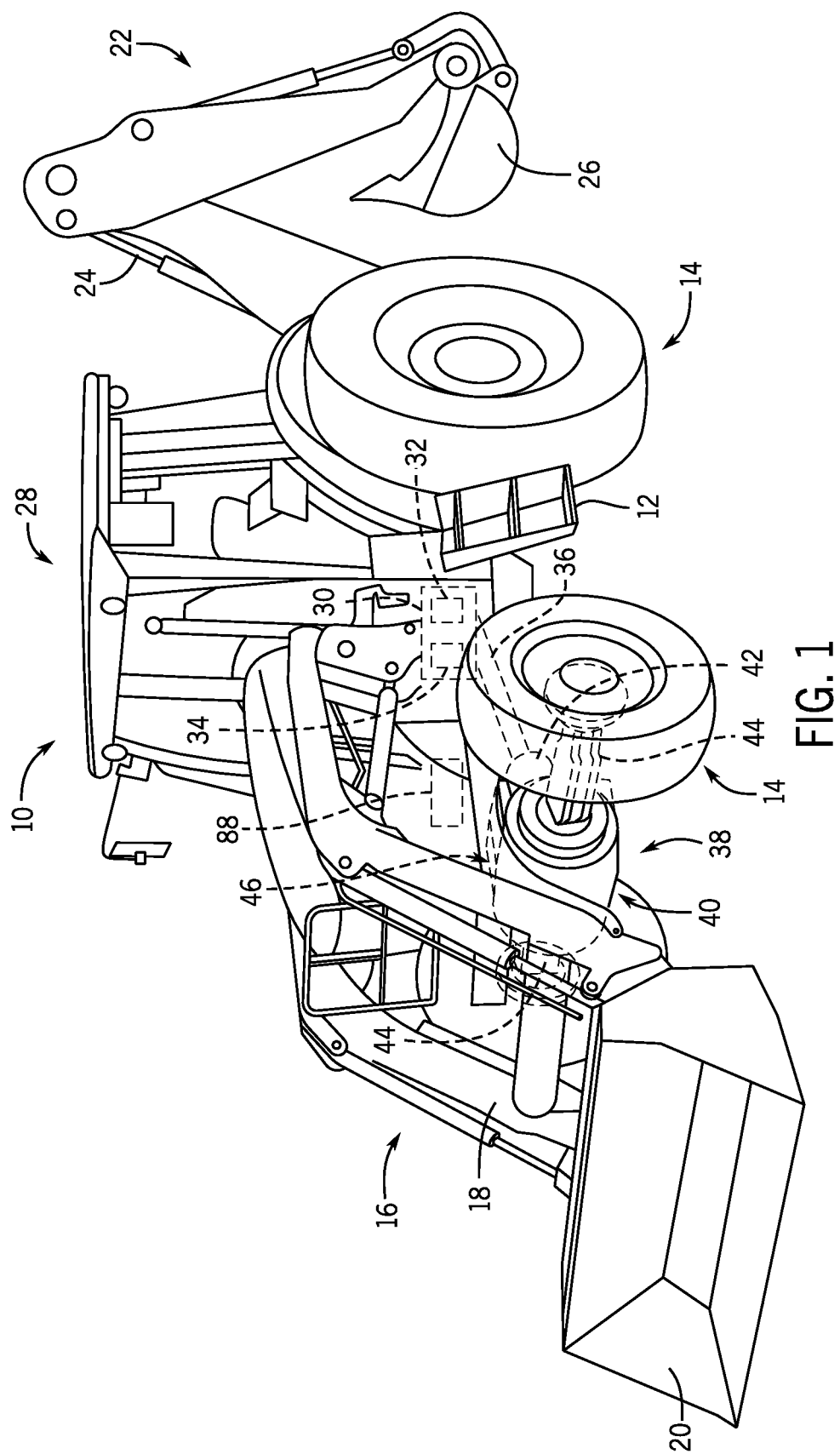
FIG. 1 is a perspective view of an example work vehicle in which embodiments of the present disclosure may be implemented.

Like reference symbols in the various drawings indicate like elements. For simplicity and clarity of illustration, descriptions and details of well-known features and techniques may be omitted to avoid unnecessarily obscuring the example and non-limiting embodiments described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present disclosure, as set-forth in the appended claims.

Overview

As previously noted, work vehicles typically utilize a park brake that can be selectively engaged with a drivetrain component to substantially prevent or inhibit movement of the work vehicle. In some work vehicle configurations, such as in various backhoe loader designs, the park brake is provided as a stand-alone component that is mounted on the vehicle driveline or drive shaft, between the transmission and the front axle, to impart a brake force that arrests rotation of the drive shaft.

While positioning of the park brake on the drive shaft as described above may provide effective braking capability in the work vehicle, it is recognized that there are several drawbacks to such a park brake construction and location. As one example, mounting of the park brake on the vehicle drive shaft between the transmission and the front axle consumes a large amount of space within the vehicle drivetrain. As another example, park brakes as described above are typically externally-sourced components that are acquired at high cost from a manufacturer.

To address the issues of size and cost associated with existing work vehicle park brakes, a work vehicle is provided with an axle-integrated park brake. The axle-integrated park brake is disposed within a housing of a drive axle assembly and at an input to the drive axle assembly. By integrating the park brake into the drive axle assembly, the cost and space claim of the park brake can be reduced while still meeting park brake holding capacity requirements.

According to embodiments, the park brake assembly includes a Belleville spring arrangement to provide park brake actuation or release. The Belleville spring arrangement may include one or a plurality of Belleville springs that act on an annular piston in the park brake assembly, with the piston, in turn, moving relative to and acting on or releasing a brake pack that imparts a brake force that arrests rotation of an input shaft of the axle assembly.

In one embodiment, the piston of the park brake assembly moves within a piston housing that is disposed in the axle housing. The piston housing includes a mechanical stop positioned to limit a stroke of the piston, with the mechanical stop positioned to limit the stroke of the piston within a range that prevents the Belleville spring(s) from flattening or prevents the Belleville spring(s) from contacting each other. In particular, the mechanical stop limits the stroke of the piston when the park brake assembly operates in a released position where no brake force is imparted to arrest rotation of the input shaft.

In another embodiment, the park brake assembly includes one or more spacers that are positioned between adjacent Belleville springs to provide separation therebetween. The spacer may be provided as an annular wire positioned about an outer circumference of a flange formed on the annular piston, and adjacent an inner edge of the Belleville springs.

Integration of the park brake assembly into the drive axle assembly, and positioning of the park brake assembly within the axle housing, allows for lubrication of the park brake assembly and the drive axle assembly (e.g., a gear assembly and pinion bearings thereof) via a common lubrication system. The lubrication system may provide both pressurized and splash lubrication to the drive axle assembly and the park brake assembly to ensure sufficient lubrication thereto in all operating conditions.

Example embodiments of a work vehicle that includes an axle-integrated park brake will now be described in conjunction with FIGS. 1-4 according to this disclosure. By way of non-limiting examples, the following describes the park brake assembly as being incorporated into a backhoe loader. The following examples notwithstanding, alternative work vehicles of other constructions would also benefit from the axle-integrated park brake assembly being incorporated therein. It is therefore recognized that aspects of the disclosure are not meant to be limited only to the specific embodiments described hereafter.

Example Embodiment(s) of an Axle-Integrated Park Brake in a Work Vehicle

According to embodiments, a work vehicle is disclosed that includes an axle-integrated park brake assembly. As will become apparent to those skilled in the art from the following description, the park brake assembly finds particular applicability in work vehicles, and therefore the illustrative examples discussed herein utilize such an environment to aid in the understanding of the disclosure.

Referring initially to FIG. 1, a work vehicle 10 is shown that can implement details of one or more embodiments. In the illustrated example, the work vehicle 10 is depicted as a backhoe loader, and thus is hereafter referenced as "backhoe loader 10." It will be understood, however, that other configurations may be possible, including configurations with the work vehicle as a mining machine, tractor, a harvester, a log skidder, or one of various other work vehicle types.

The backhoe loader 10 includes a chassis 12 and a ground engaging mechanism or ground drive element 14. The ground engaging mechanism 14 is capable of supporting the chassis 12 and propelling the chassis 12 across the ground. Although the illustrated backhoe loader 10 includes wheels as ground engaging mechanism 14, the backhoe loader 10 may include other ground engaging mechanisms, such as steel tracks, rubber tracks, or other suitable ground engaging members.

The backhoe loader 10 further includes a loader assembly 16 and a backhoe assembly 22. As illustrated in FIG. 1, the loader assembly 16 includes a loader boom 18 and a work tool 20 in the form of a bucket. The work tool 20 may be capable of moving, excavating, plowing, or performing other material handling functions on a load, such as dirt or other materials. Other suitable work tools include, for example, blades, pallet forks, bale lifts, augers, harvesters, tillers, mowers, and grapples. The loader boom 18 is configured to move relative to the chassis 12 to move and operate the work tool 20. The backhoe assembly 22 of the backhoe loader 10 includes a backhoe boom 24 and a tool such as a backhoe bucket 26 having telehandler tool features. The backhoe boom 24 is attached to the chassis 12 by a swing frame, with the backhoe boom 24 being pivotable relative to the chassis 12. The backhoe bucket 26 is in turn pivotably mounted to the backhoe boom 24 and extendable away therefrom via an extendable dipperstick, such that the backhoe bucket 26 has further freedom of movement during operation.

An operator or autonomous control may operate the backhoe loader 10, including the ground engaging wheels 14, the loader assembly 16, and the backhoe assembly 22, from an operator station 28 in the backhoe loader 10. While not shown in FIG. 1, it is recognized that the operator station 28 may include a human-machine interface and various controls therein configured to receive input commands from the operator to control, for example, various electric or hydraulic systems associated with actuating and controlling the loader assembly 16 and the backhoe assembly 22. The human-machine interface may be configured in a variety of ways and may include one or more joysticks, various switches or levers, one or more buttons, a touchscreen interface that may be overlaid on a display, a keyboard, a speaker, a microphone associated with a speech recognition system, or various other human-machine interface devices.

The chassis 12 also supports an engine system 30 that provides, generates, and distributes mechanical and electrical power to various components of the backhoe loader 10. The engine system 30 may include an internal combustion engine 32, for example, that operates to output rotational power that may be provided through a transmission 34 to a drive shaft 36 of the backhoe loader 10. The drive shaft 36, in turn, provides this rotational power to a drive axle assembly 38 that operates to transfer the power to the ground engaging mechanism 14 of the backhoe loader 10, which in the illustrated embodiment are the front wheels of the backhoe loader 10.

The drive axle assembly 38 includes a gear assembly 40 (e.g., differential) that operates to transfer power in a controlled manner from the drive shaft 36 to the ground engaging wheels 14 of the backhoe loader 10. An input shaft 42 of the gear assembly 40 is coupled for co-rotation with the drive shaft 36, and the input shaft 42 provides rotational power to an arrangement of gears (not shown) in the gear assembly 40. The gear assembly 40, in turn, is coupled to axle shafts 44 of the drive axle assembly 38, with the axle shafts 44 coupled to the ground-engaging wheels 14 of the work vehicle to cause the ground engaging wheels or tracks thereof to rotate.

According to embodiments, a park brake assembly 46 is integrated into the drive axle assembly 38 to provide a drive axle assembly with integrated park brake. The park brake assembly 46 is operable to impart a brake force that arrests rotation of the input shaft 42 of the drive axle assembly 38, thereby providing a braking force to the backhoe loader and preventing or inhibiting movement of the loader. As will be explained in further detail below, integration of the park brake assembly 46 with the drive axle assembly 38 provides a space savings in the backhoe loader 10 and provides benefits regarding ease of assembly and lubrication of components.

Figure 2:
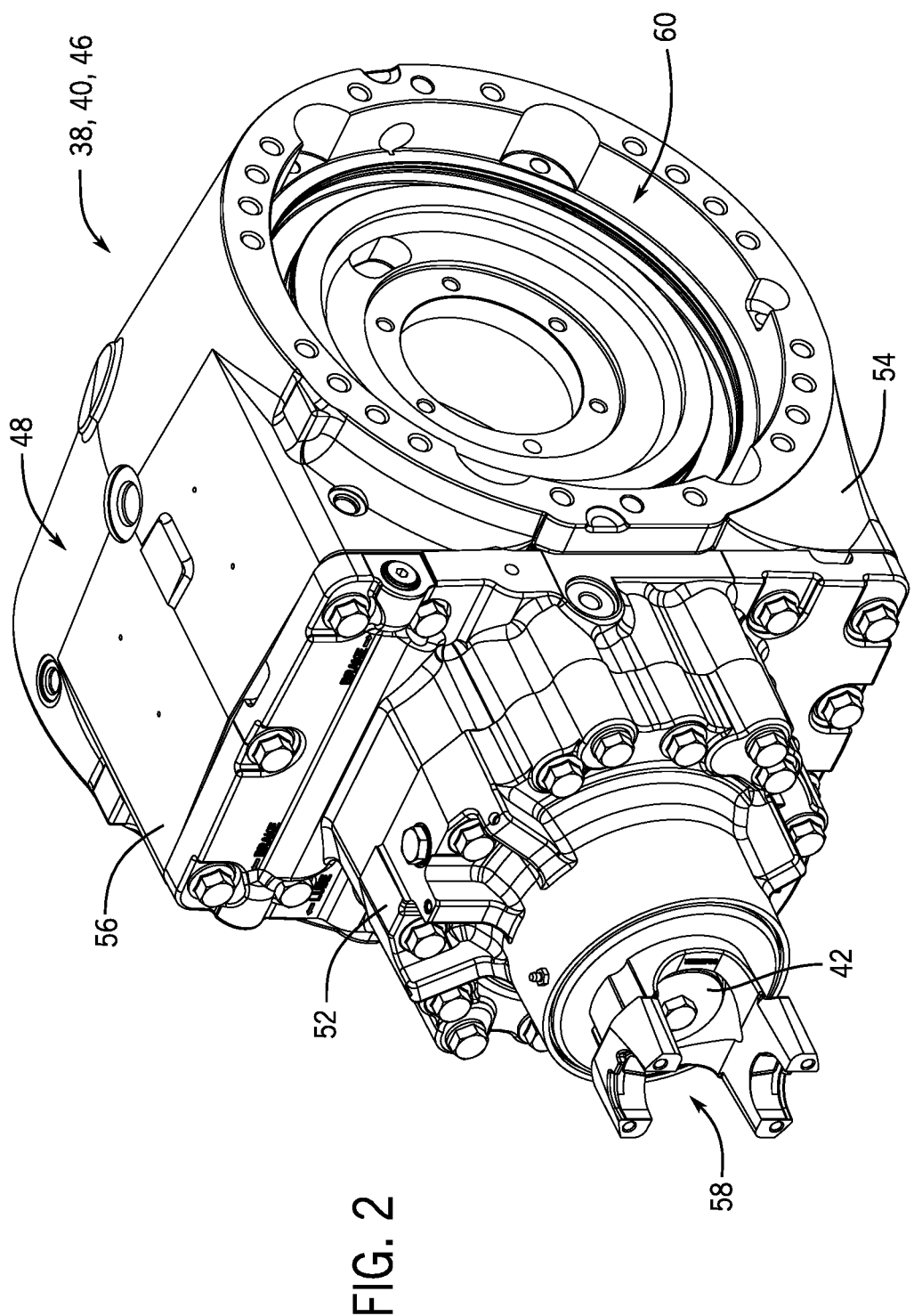
FIG. 2 is a perspective view of a park brake assembly integrated with a drive axle assembly of the vehicle of FIG. 1.
Figure 3:
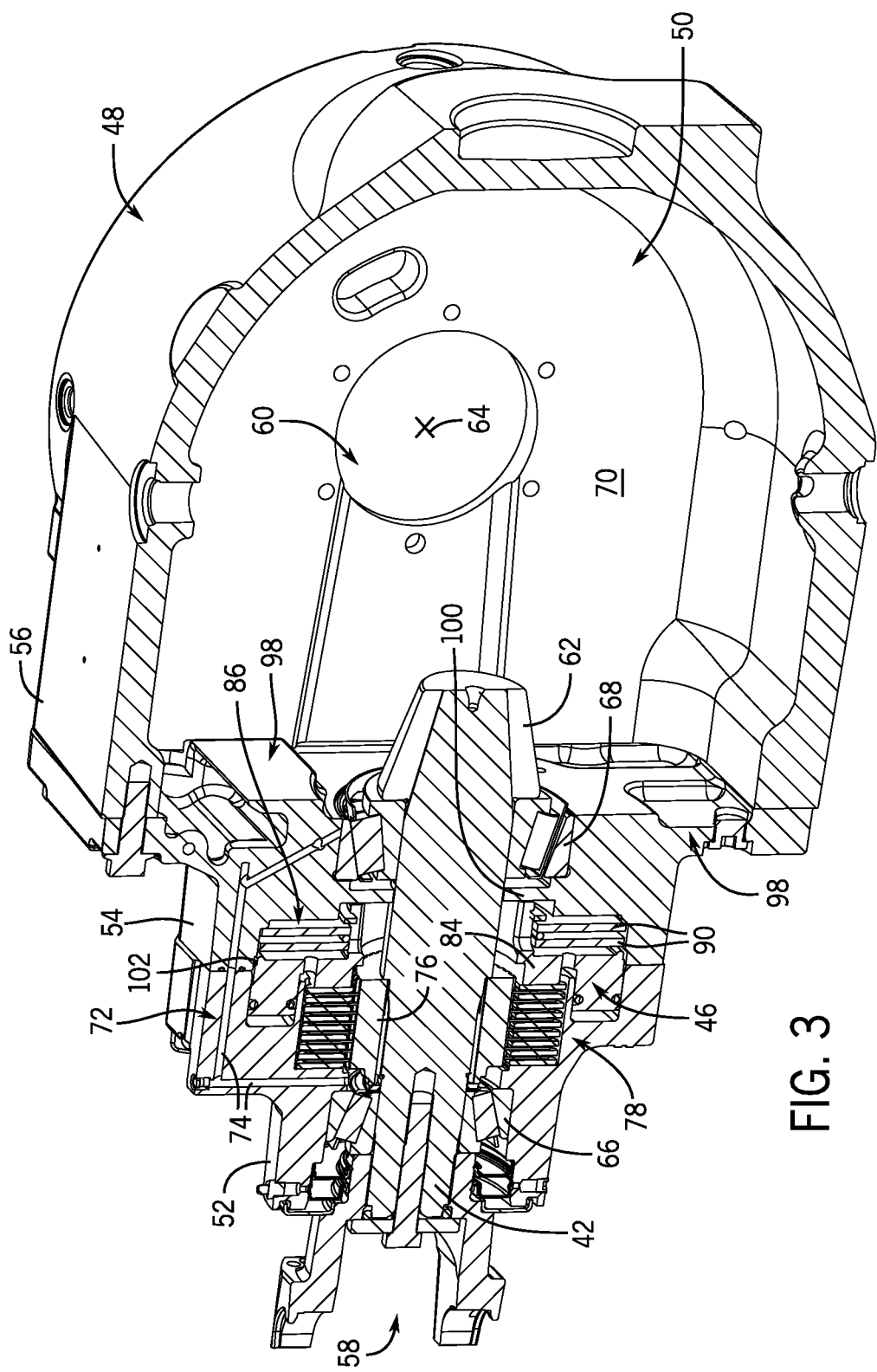
FIG. 3 is a perspective view, taken along plane 3 of FIG. 2, of internal components of the axle-integrated park brake assembly of FIG. 2.
Figure 4:
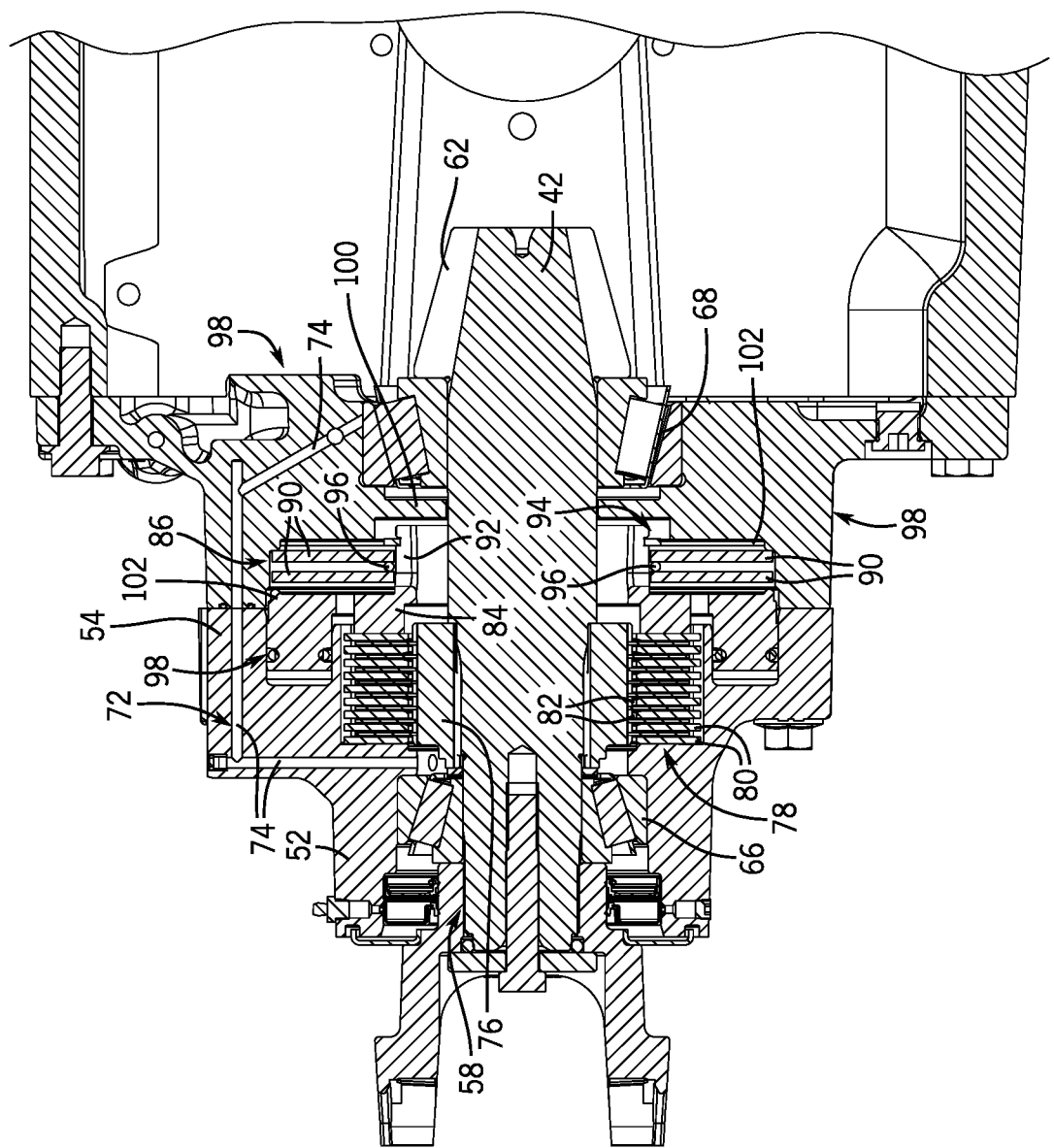
FIG. 4 is an enlarged view of a portion of FIG. 3.

Referring now to FIGS. 2-4, the axle-integrated park brake assembly 46 is illustrated in accordance with an embodiment. As shown therein, the drive axle assembly 38 includes an axle housing 48 having an interior cavity 50 within which the gear assembly and park brake assembly 46 are disposed to provide environmental protection and allow for lubrication. In certain embodiments, the axle housing 48 may be an assembly of a housing body and cover components. For example, axle housing 48 may include a front cover 52, which may be bolted (or otherwise attached) to a main body 54 of the axle housing 48. Similarly, the axle housing 48 may include a top cover 56, which may be bolted (or otherwise attached) to the front cover 52. It will be understood that these (and various other) housing parts may be formed or attached to the axle housing 48 in various ways and that, in certain embodiments, an integral component may be utilized in place of two or more parts. The axle housing 48 also includes an input opening 58 through which the input shaft 42 extend, as well as output openings 60 through which the axle shafts 44 extend to couple with the gear assembly 40.

The input shaft 42 of the drive axle assembly 38 is coupled for co-rotation with the drive shaft 36. In certain embodiments, the input shaft 42 may include a pinion gear 62, which may mesh with a ring gear (not shown) of the gear assembly 40. The input shaft 42 may, accordingly, provide drive power from the drive shaft 36 (which in turn is driven by a power source, such as the engine 32) to the two axle shafts 44 via the ring gear (not shown) rotating around a center of rotation 64. The input shaft 42 may be supported by various bearings, such as a tail bearing 66 and a head bearing 68, as shown in FIGS. 3 and 4.

In certain embodiments, the axle housing 48 may be configured to contain lubrication fluid within the cavity 50, such as in a primary sump 70 within the cavity 50 that forms part of a general lubrication system 72. Gears of the gear assembly 40 may, for example, be rotatably mounted within the axle housing 48 and one or more gears thereof (e.g., a ring gear, not shown) may accordingly rotate around the center of rotation 64. In certain configurations, the ring gear (or other component) may extend, at least in part, into the primary sump 70. As such, as the ring gear rotates it may splash lubrication fluid (e.g., oil) from the primary sump 70 to various other locations within the cavity 50, to lubricate the bearings 66, 68 and components of the park brake assembly 46.

In certain configurations, the lubrication system 72 may also include various fluid flow passages that extend from the primary sump 70 (or another area(s) containing lubrication fluid) toward various moving components. For example, passages 74 may extend through the front cover 52 from the primary sump 70. Passages 74 may vary in number and configuration, as well as function. For example, certain passages 74 may primarily provide flow paths for pressurized lubrication from the primary sump 70 (or other areas) to various moving components (e.g., bearings 66, 68 and moving components of the park brake assembly 46), while other passages 74 may primarily provide escape paths for trapped air and other passages 74 may primarily provide lubrication drainage.

As shown in FIGS. 3 and 4, the park brake assembly 46 includes a hub 76 coupled to the input shaft 42, an annular brake pack 78 (including separator plates 80 and friction discs 82) disposed about the hub 76 and about the input opening 58 of the axle housing 48, an annular piston 84 disposed about the input opening 58 of the axle housing 48 and configured to move relative to and act on the brake pack 78, and a spring arrangement 86 disposed about the input opening 58 of the axle housing 48 and that acts on the piston 84. In the illustrated embodiment, the park brake assembly 46 is configured as a spring-applied and hydraulically-released brake assembly where the spring arrangement 86 is preloaded with a spring force that acts on the piston 84, and where the park brake assembly 46 comprises a hydraulic brake release (generally indicated at 88 in FIG. 1) operable (such as via controls in the operator station 28) to selectively counteract the spring force of the spring arrangement 86. However, it is recognized that the park brake assembly 46 could instead be configured as a hydraulically-applied and spring-released brake assembly.

The hub 76 is mounted to the input shaft 42, such as through a splined connection, so as to rotate therewith. In the brake pack 78, the friction discs 82 may rotate with the hub 76, while the separator plates 80 are grounded to the axle housing 48 (or to another feature that is fixed relative to the rotation of the input shaft 42). The piston 84 is configured to move relative to, and act on, the brake pack 78 during operation of the park brake assembly 46. That is, the piston 84 may contact a braking surface of the brake pack 78 and cause the separator plates 80 to come into contact with and engage the friction discs 82, thereby generating or imparting a braking force to arrest rotation of the input shaft 42.

The spring arrangement 86 comprises one or more Belleville springs 90, with the illustrated embodiment showing the arrangement including two Belleville springs 90, but with it recognized that more (e.g., four) or less (e.g., one) Belleville springs 90 could be provided in the spring arrangement 86. Each of the Belleville springs 90 comprises a conical disc shaped spring or washer, and the Belleville springs 90 may be arranged in a stacked arrangement. In one embodiment, one or more of the Belleville springs 90 may be oriented in a first direction, while one or more others of the Belleville springs 90 may be oriented in an opposite second direction. The Belleville springs 90 have a non-linear spring rate such that, by stacking the springs, the spring arrangement 86 provides a more variable rate of spring force without completely compressing the springs, and such that as the Belleville springs 90 approach a flat condition (or go past flat), the spring force thereof does not change substantially.

As shown in FIGS. 3 and 4, the spring arrangement 86 is positioned and configured such that the input shaft 42 and an annular flange 92 of the piston 84 pass through a center opening 94 of the Belleville springs 90. The inner diameter of the Belleville springs 90 is similarly sized to an outer diameter of the annular flange 92 to enable the piston 84 (and annular flange 92 thereof) to move relative to the Belleville springs 90 while still functioning to maintain the Belleville springs 90 in their stacked alignment. A spacer 96 is positioned between the adjacent Belleville springs 90 to separate them from one another. The spacer 96 may be configured as an annular wire that is positioned adjacent the inner diameter of the Belleville springs 90 and about the outer circumference of annular flange 92. The spacer 96 provides a support surface for the inner edge of the Belleville springs 90 and prevents the Belleville springs 90 from having to ride/sit on that inner edge, thereby increasing the longevity of the Belleville springs 90. The spacer 96 also allows the Belleville springs 90 to goes past flat during a deflection thereof to allow the Belleville springs 90 to operate in a region where the spring force applied thereby is more constant.

Responsive to the spring arrangement 86 (and hydraulic brake release 88) acting on the piston 84, the piston 84 is caused to move relative to the brake pack 78. In particular, the piston 84 moves relative to a piston housing 98 within which it is positioned. The piston housing 98 is, in turn, disposed within the axle housing 48 so as to be fixed in position relative thereto. The piston housing 98 provides for linear movement of the piston 84 therein and also operates to limit a stroke of the piston 84 according to one or more contact surfaces or mechanical stops 100 included on the piston housing 98. That is, as the piston 84 moves away from the brake pack 78 from an engaged position to a released position (upon operation of the hydraulic brake release 88, for example), the mechanical stop 100 functions to limit the stroke of the piston 84, which beneficially prevents the Belleville springs 90 from bottoming out (i.e., flexing/bending to flat) or contacting each other and also reduces windage in the park brake assembly 46.

In one embodiment, the piston housing 98 also includes bumps or protrusions 102 that interact with the Belleville springs 90. The bumps 102 are formed on the piston housing 98 adjacent the outer edge of the Belleville springs 90 to provide a support surface thereto. The bumps 102 provide a rolling contact point for the Belleville springs 90 and prevent the springs from digging into the casting of the piston housing 98, thereby increasing the longevity of the Belleville springs 90.

As illustrated in FIGS. 3 and 4, the park brake assembly 46 is positioned at the input side of the drive axle assembly 38, with the annular brake pack 78 disposed about the input opening 58 of the axle housing 48, the annular piston 84 disposed about the input opening 58 of the axle housing 48, and the spring arrangement 86 disposed about the input opening 58 of the axle housing 48. In particular, the park brake assembly 46 may be positioned between the tail bearing 66 and the head bearing 68 of the drive axle assembly 38. This positioning of the park brake assembly 46 is positioned at the input side of the drive axle assembly 38 enables the park brake assembly 46 to impart a brake force to the input shaft 42 of the gear assembly 40 to arrest rotation thereof. As the input shaft 42 spins at a higher velocity than the axle shafts 44, positioning of the park brake assembly 46 at the input (rather than on the axle shafts 44 adjacent the ground engaging wheels 14) to arrest rotation of the input shaft 42 provides for improved performance and efficiency of the park brake assembly 46 as opposed to it being positioned in alternative locations.

Embodiments of the work vehicle described herein provide an axle-integrated park brake assembly for a work vehicle. The park brake assembly in disposed within an axle housing of the drive axle assembly and at the input to the drive axle assembly to arrest rotation of the input shaft thereof. The park brake assembly includes a Belleville spring arrangement that engages or releases the brake piston, with the piston moving relative to and acting on a brake pack of the park brake assembly to selectively provide a brake force that arrests rotation of the input shaft. A mechanical stop feature is provided on a piston housing of the park brake assembly that limits the stroke of the piston to prevent Bellville springs in the spring arrangement from colliding with each other during operation of the park brake assembly in a released condition, thereby maintaining a running clearance of the springs during operation in the released condition. Integration of the park brake assembly into the drive axle assembly also beneficially reduces the cost of the assembly and the space claim of the assembly within the vehicle, making it a more economical solution than existing park brake assembly designs.

ENUMERATED EXAMPLES

The following examples are provided, which are numbered for ease of reference.

1. A work vehicle includes an engine, a drive shaft configured to be rotated by the engine, and a drive axle assembly. The drive axle assembly further includes an axle housing having an input opening and output openings in communication with an interior cavity, axle shafts coupled to ground-engaging wheels or tracks of the work vehicle, and a gear assembly disposed in the interior cavity of the axle housing, the gear assembly having an input shaft extending through the input opening and coupled for co-rotation with the drive shaft, the gear assembly coupled to the axle shafts at the output openings and configured to transfer rotational power from the drive shaft to one or more of the axle shafts to cause rotation of one or more of the axle shafts. The work vehicle also includes a park brake assembly disposed within the axle housing and configured to impart a brake force to arrest rotation of the input shaft of the gear assembly, with the park brake assembly comprising an annular brake pack disposed about the input opening of the axle housing, an annular piston disposed about the input opening of the axle housing and configured to move relative to and act on the brake pack, and a spring arrangement disposed about the input opening of the axle housing and comprising a Belleville spring acting on the piston.

2. The work vehicle of example 1, wherein the park brake assembly includes a piston housing mounted in the interior cavity of the axle housing and within which the piston moves, the piston housing including a mechanical stop positioned to limit a stroke of the piston.

3. The work vehicle of example 2, wherein the mechanical stop is positioned to limit the stroke of the piston within a range that prevents the Belleville spring from flattening or prevents the Belleville spring from contacting a second adjacent Belleville spring.

4. The work vehicle of example 2, wherein the park brake assembly operates in an engaged position to impart the brake force and a released position where no brake force is imparted, and wherein the mechanical stop limits the stroke of the piston when the park brake assembly operates in the released position.

5. The work vehicle of example 1, wherein the spring arrangement includes a second Belleville spring in a stacked arrangement with the Belleville spring and a spacer positioned between the Belleville spring and the second Belleville spring to separate the Belleville spring from the second Belleville spring.

6. The work vehicle of example 5, wherein the spacer is an annular wire positioned adjacent an inner edge of each of the Belleville spring and the second Belleville spring.

7. The work vehicle of example 6, wherein the annular wire is positioned about an outer circumference of a flange formed on the annular piston.

8. The work vehicle of example 1, further including a lubrication system that provides a lubricant to the gear assembly and the park brake assembly in the interior cavity of the axle housing.

9. The work vehicle of example 1, wherein the park brake assembly is a spring applied-hydraulically released assembly, where the Belleville spring is preloaded with a spring force that acts on the piston, and where the park brake assembly comprises a hydraulic brake release operable to selectively counteract the spring force of the Belleville spring.

10. The work vehicle of example 1, wherein the drive axle assembly includes a head bearing and a tail bearing disposed in the axle housing that support the input shaft, and wherein the park brake assembly is positioned between the head bearing and the tail bearing.

11. A drive axle assembly with integrated park brake is provided for a work vehicle. The assembly includes axle shafts coupled to ground-engaging wheels or tracks of the work vehicle and a gear assembly having an input shaft coupled for co-rotation with a drive shaft of the work vehicle and coupled to the axle shafts to selectively transfer rotational power from the drive shaft to the axle shafts to cause rotation of one or more of the axle shafts. The assembly also includes an axle housing enclosing the gear assembly and a park brake assembly disposed within the axle housing that is configured to impart a brake force to arrest rotation of the input shaft of the gear assembly. The park brake assembly further includes an annular brake pack disposed about the input shaft, an annular piston disposed about the input shaft and configured to move relative to and act on the brake pack, and a Belleville spring unit disposed adjacent the piston and that acts on the piston.

12. The assembly of example 11, wherein the park brake assembly comprises a piston housing positioned within the axle housing and within which the piston moves, the piston housing including a mechanical stop positioned to limit a stroke of the piston.

13. The assembly of example 12, wherein the Belleville spring unit comprises a plurality of Belleville springs arranged in a stacked alignment, and wherein the mechanical stop is positioned to limit the stroke of the piston within a range that prevents each of the plurality of Belleville springs from flattening or prevents a respective Belleville spring of the plurality of Belleville springs from contacting another adjacent Belleville spring of the plurality of Belleville springs.

14. The assembly of example 13, further including a spacer positioned between each adjacent pair of Belleville springs in the plurality of Belleville springs, to separate the Belleville springs.

15. The assembly of example 14, wherein the spacer is an annular wire positioned adjacent an inner edge of each respective Belleville spring of the adjacent pair of Belleville springs.

CONCLUSION

The foregoing has thus provided an axle-integrated park brake assembly for a work vehicle that addresses limitations regarding cost and space claim of existing park brake assemblies. The park brake assembly is provided at the input to the drive axle assembly to arrest rotation of the input shaft thereof and provide adequate holding capacity. A Belleville spring arrangement acts on or releases a piston of the park brake assembly that, in turn, acts on a brake pack of the park brake assembly to selectively provide a brake force that arrests rotation of the input shaft. Mechanical stop and spacer features in the park brake assembly further limit deflection of the Bellville springs in the spring arrangement and prevent the springs from colliding with each other during operation of the park brake assembly in a released condition, thereby reducing wear on the Bellville springs and increasing longevity of the park brake assembly.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:
1. A work vehicle comprising:
an engine;
a drive shaft configured to be rotated by the engine;
a drive axle assembly comprising:
an axle housing having an input opening and output openings in communication with an interior cavity;
axle shafts coupled to ground-engaging wheels or tracks of the work vehicle; and
a gear assembly disposed in the interior cavity of the axle housing, the gear assembly having an input shaft extending through the input opening and coupled for co-rotation with the drive shaft, the gear assembly coupled to the axle shafts at the output openings and configured to transfer rotational power from the drive shaft to one or more of the axle shafts to cause rotation of one or more of the axle shafts; and a park brake assembly disposed within the axle housing comprising:
an annular brake pack disposed about the input opening of the axle housing;
an annular piston disposed about the input opening of the axle housing and configured to move relative to and act on the brake pack; and
a spring arrangement disposed about the input opening of the axle housing and comprising a Belleville spring acting on the piston;
wherein the park brake assembly is configured to impart a brake force to arrest rotation of the input shaft of the gear assembly.

2. The work vehicle of claim 1, wherein the park brake assembly comprises a piston housing mounted in the interior cavity of the axle housing and within which the piston moves, the piston housing including a mechanical stop positioned to limit a stroke of the piston.

3. The work vehicle of claim 2, wherein the mechanical stop is positioned to limit the stroke of the piston within a range that prevents the Belleville spring from flattening or prevents the Belleville spring from contacting a second adjacent Belleville spring.

4. The work vehicle of claim 2, wherein the park brake assembly operates in an engaged position to impart the brake force and a released position where no brake force is imparted, and wherein the mechanical stop limits the stroke of the piston when the park brake assembly operates in the released position.

5. The work vehicle of claim 1, wherein the spring arrangement comprises:
a second Belleville spring in a stacked arrangement with the Belleville spring; and
a spacer positioned between the Belleville spring and the second Belleville spring to separate the Belleville spring from the second Belleville spring.

6. The work vehicle of claim 5, wherein the spacer comprises an annular wire positioned adjacent an inner edge of each of the Belleville spring and the second Belleville spring.

7. The work vehicle of claim 6, wherein the annular wire is positioned about an outer circumference of a flange formed on the annular piston.

8. The work vehicle of claim 1, further comprising a lubrication system that provides a lubricant to the gear assembly and the park brake assembly in the interior cavity of the axle housing.

9. The work vehicle of claim 8, wherein the lubrication system provides both pressurized and splash lubrication to the gear assembly and the park brake assembly.

10. The work vehicle of claim 1, wherein the park brake assembly is a spring applied-hydraulically released assembly, where the Belleville spring is preloaded with a spring force that acts on the piston, and where the park brake assembly comprises a hydraulic brake release operable to selectively counteract the spring force of the Belleville spring.

11. The work vehicle of claim 1, wherein the drive axle assembly comprises a head bearing and a tail bearing disposed in the axle housing that support the input shaft, and wherein the park brake assembly is positioned between the head bearing and the tail bearing.

12. A drive axle assembly with integrated park brake for a work vehicle, the assembly comprising:
axle shafts coupled to ground-engaging wheels or tracks of the work vehicle;
a gear assembly having an input shaft coupled for co-rotation with a drive shaft of the work vehicle and coupled to the axle shafts to selectively transfer rotational power from the drive shaft to the axle shafts to cause rotation of one or more of the axle shafts;
an axle housing enclosing the gear assembly; and
a park brake assembly disposed within the axle housing comprising:
an annular brake pack disposed about the input shaft;
an annular piston disposed about the input shaft and configured to move relative to and act on the brake pack; and
a Belleville spring unit disposed adjacent the piston and that acts on the piston;
wherein the park brake assembly is configured to impart a brake force to arrest rotation of the input shaft of the gear assembly.

13. The assembly of claim 12, wherein the park brake assembly comprises a piston housing positioned within the axle housing and within which the piston moves, the piston housing including a mechanical stop positioned to limit a stroke of the piston.

14. The assembly of claim 13, wherein the Belleville spring unit comprises a plurality of Belleville springs arranged in a stacked alignment.

15. The assembly of claim 14, wherein the mechanical stop is positioned to limit the stroke of the piston within a range that prevents each of the plurality of Belleville springs from flattening or prevents a respective Belleville spring of the plurality of Belleville springs from contacting another adjacent Belleville spring of the plurality of Belleville springs.

16. The assembly of claim 14, further comprising a spacer positioned between each adjacent pair of Belleville springs in the plurality of Belleville springs, to separate the Belleville springs.

17. The assembly of claim 16, wherein the spacer comprises an annular wire positioned adjacent an inner edge of each respective Belleville spring of the adjacent pair of Belleville springs.

18. The assembly of claim 12, wherein the drive axle assembly comprises a head bearing and a tail bearing disposed in the axle housing that support the input shaft, and wherein the park brake assembly is positioned between the head bearing and the tail bearing.

19. The assembly of claim 18, wherein the park brake assembly is a spring applied-hydraulically released assembly, where the Belleville spring unit is preloaded with a spring force that acts on the piston, and where the park brake assembly comprises a hydraulic brake release operable to selectively counteract the spring force of the Belleville spring unit.

20. The assembly of claim 12, further comprising a lubrication system that provides a lubricant to each of the gear assembly and the park brake assembly within the axle housing.

* * * * *